H. H. SHANNON.
TIRE PROTECTOR.
APPLICATION FILED JUNE 24, 1922.

1,435,086.

Patented Nov. 7, 1922.
3 SHEETS—SHEET 1.

H. H. Shannon
INVENTOR

BY Victor J. Evans
ATTORNEY

WITNESS:

H. H. SHANNON.
TIRE PROTECTOR.
APPLICATION FILED JUNE 24, 1922.

1,435,086.

Patented Nov. 7, 1922.
3 SHEETS—SHEET 2.

H. H. Shannon
INVENTOR

BY Victor J. Evans
ATTORNEY

WITNESS:

H. H. SHANNON.
TIRE PROTECTOR.
APPLICATION FILED JUNE 24, 1922.
1,435,086.
Patented Nov. 7, 1922.
3 SHEETS—SHEET 3.
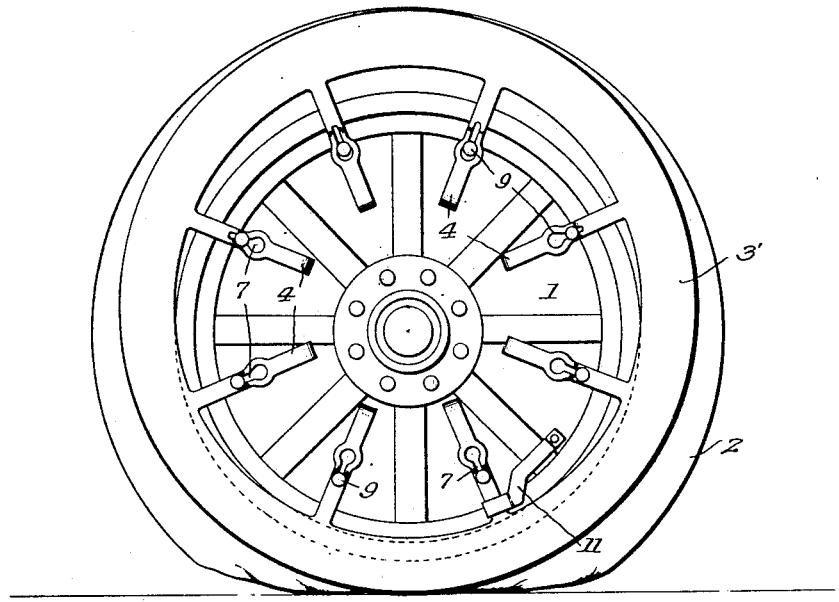
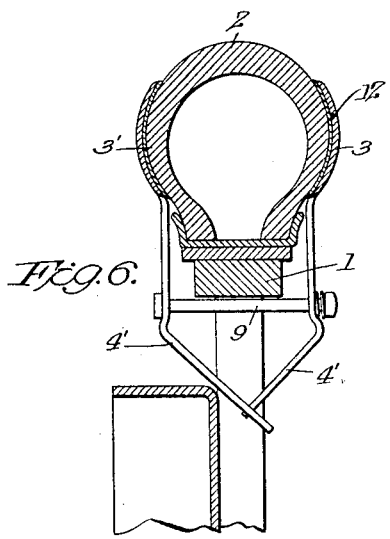 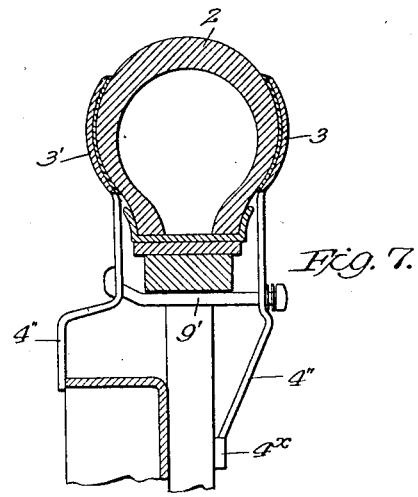
H. H. Shannon,
INVENTOR
BY Victor J. Evans
ATTORNEY
WITNESS:

Patented Nov. 7, 1922.

1,435,086

UNITED STATES PATENT OFFICE.

HOWARD H. SHANNON, OF SALT CREEK, WYOMING.

TIRE PROTECTOR.

Application filed June 24, 1922. Serial No. 570,526.

*To all whom it may concern:*

Be it known that I, HOWARD H. SHANNON, a citizen of the United States, residing at Salt Creek, in the county of Natrona and State of Wyoming, have invented new and useful Improvements in Tire Protectors (Case B), of which the following is a specification.

This invention relates to a tire protector, the general object of the invention being to provide means for protecting the side walls of a tire so that the same will not be injured by the walls of ruts, curbing and the like.

Another object of the invention is to provide means whereby the device will be detached from the wheel if the pneumatic tire should collapse for any reason, thus preventing damage to the device.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a side view of a wheel showing the tire of the same in collapsed condition and showing the device as being partly detached from the wheel.

Figure 1:
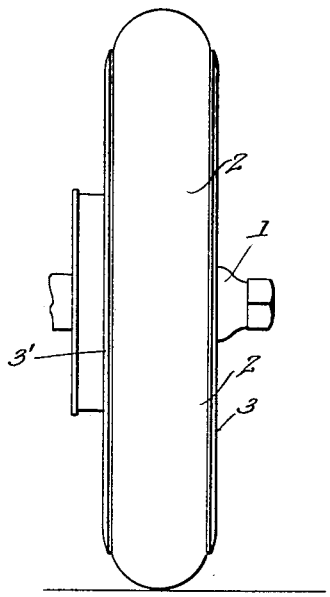
Figure 1 is an edge view of a wheel provided with my invention.
Figure 5:
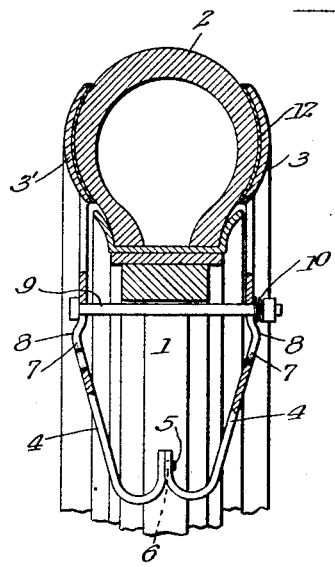

The remaining figures are detail views and views of modifications.

In these views 1 indicates the wheel and 2 the tire thereof. In carrying out my invention I provide a ring-shaped member 3 which is preferably formed of spring metal, for engaging each side of the tire, the inner member 3' being formed of two parts which are connected together by the tongue and groove connections 3''. This permits the said inner member to be placed in position on the wheel and removed therefrom without removing the wheel. Each member is provided with inwardly extending spokes 4 which have their inner ends curved inwardly, the ends of the spokes on one member being connected with those of the other member by the pin 5 on one set of spokes engaging holes 6 in the other set. Each spoke is provided with a key-hole shaped slot 7 and with a hump 8 adjacent the small outer end of the slot for holding a connecting bolt 9 at said small end. This bolt has its head made small enough to pass through the large end of the slot. The bolt passes transversely between the spokes of the wheel and connects the spokes 4 of the members 3 and 3' together by passing through the key-hole shaped slots in the same. A spring 10 is placed in each bolt between the head or nut thereof and one of the spokes 4 for preventing movement of the parts. As before stated the hump 8 will hold the spokes in the small parts of the slots and thus hold the ring members in their proper positions and engaging the side walls of the tire. I also provide a member 11 which is clamped to one of the spokes of the wheel and engages a pair of the spokes 4 for preventing the device from creeping on the wheel.

From the foregoing it will be seen that with the device in place the ring members will protect the side walls of the tire from being cut or rubbed by the walls of ruts and the like or by curbing when the car is run too close to the curb. By making the parts of spring metal a certain degree of resiliency is provided so that the device will not interfere with the cushioning effect of the tire. By forming the inner member of two parts the device may be placed on the wheel without removing the wheel from its spindle. The spokes 9 and the pins 5 firmly hold the two parts of the device upon the wheel.

If the tire should collapse so that the edge of the two ring members should contact with the ground the device would assume the position shown in Figure 4 as the upward pressure would force the spokes 9, at the upper part of the device, over the humps so that they would engage the large parts of the slots and then the springs 10 would draw the heads of the bolts through the large parts of the slots, thus separating the two members. This action will continue as the wheel is rotated until all the spokes 4 would be freed of their bolts and then the device would drop from the wheel and thus prevent injury to the device.

When the device is placed on a rear wheel the inner ends of the spokes 4' are bent at an angle instead of being curved, as shown in Figure 6, so as to prevent the spokes from being interfered with by the brake drum. Figure 7 shows another arrangement of these spokes wherein the spoke 4'' of the inner member is bent at right angles so that its ends will engage the brake drum and the bolt 9' is bent and is provided with a hooked end for engaging the spoke 4''. In this case also the spoke 4'' of the outer member is provided with the enlarged end 4ˣ for engaging a spoke of the wheel.

Figure 8:
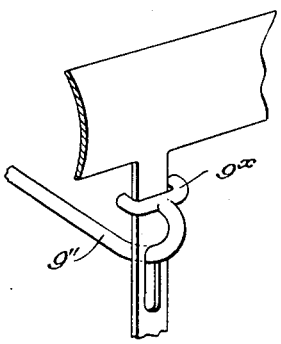
Figure 2:
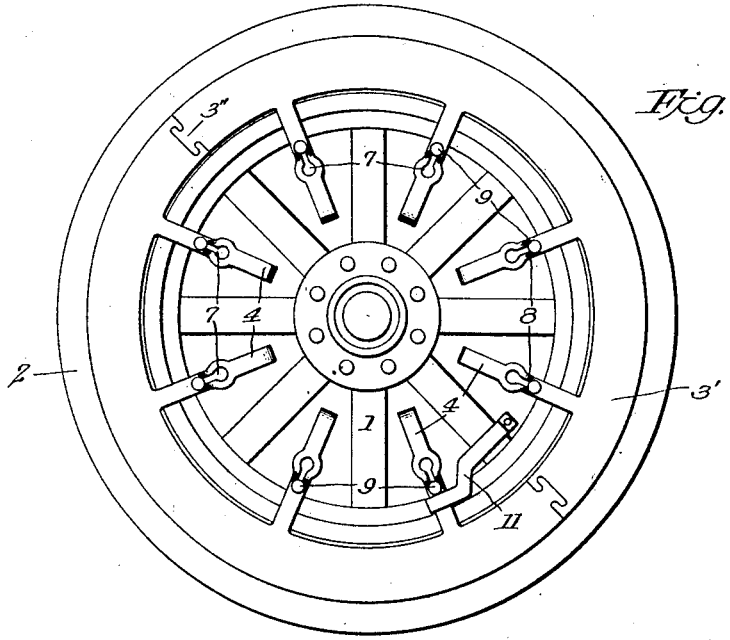
Figure 2 is a side elevation showing the inner side of the wheel.
Figure 3:
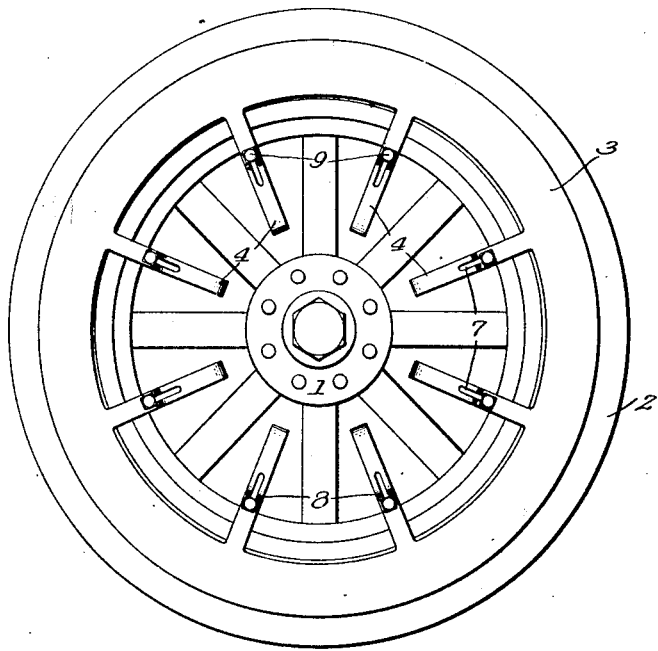
Figure 3 is a similar view of the outer side.

As shown in Figure 8 I provide the bolts 9'' with hook-shaped inner ends 9ˣ which, after passing through the spoke of the inner member, has its extremity engaging the upper part of the spoke so that the bolts will hold the inside member tightly against the tire.

A thin felt washer 12 may be placed between the ring members and the tire to prevent friction.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim:—

1. In combination with a wheel and its tire, of ring-shaped members engaging the side walls of the tire, means for connecting the members together, such means including means for separating the two members if a part of a member should contact with the road surface.

2. In combination with a wheel having a pneumatic tire, of ring-shaped members engaging the side walls of the tire, spokes connected with each member, bolts connecting the spokes of one member with those of the other and means for disengaging the bolts from the spokes of one member, if the device should engage the ground.

3. In combination with a wheel having a pneumatic tire, of ring-shaped members engaging the side walls of the tire, spokes connected with each member, bolts connecting the spokes of one member with those of the other, means for disengaging the bolts from the spokes of one member, if the device should engage the ground, such means consisting of key-hole shaped slots in the spokes through which the bolts pass and means on the spokes for normally holding the bolts in the small ends of the slots.

4. In combination with a wheel having a pneumatic tire, of ring-shaped members engaging the side walls of the tire, spokes connected with each member, bolts connecting the spokes of one member with those of the other, means for disengaging the bolts from the spokes of one member, if the device should engage the ground, such means consisting of key-hole shaped slots in the spokes through which the bolts pass, means on the spokes for normally holding the bolts in the small ends of the slots and springs on the bolts for pulling them through the large ends of the slots when the bolts are in engagement with such large ends.

5. In combination with a wheel having a pneumatic tire, of ring-shaped members engaging the side walls of the tire, one of said members being formed in sections, means for detachably connecting the sections together, means for connecting the two members together to hold them in position and means for separating the members if the device should engage the ground.

In testimony whereof I affix my signature.

HOWARD H. SHANNON.